July 4, 1933.                D. F. FROST                1,917,109
                        OXY-ARC CUTTING NOZZLE
                         Filed Dec. 7, 1929
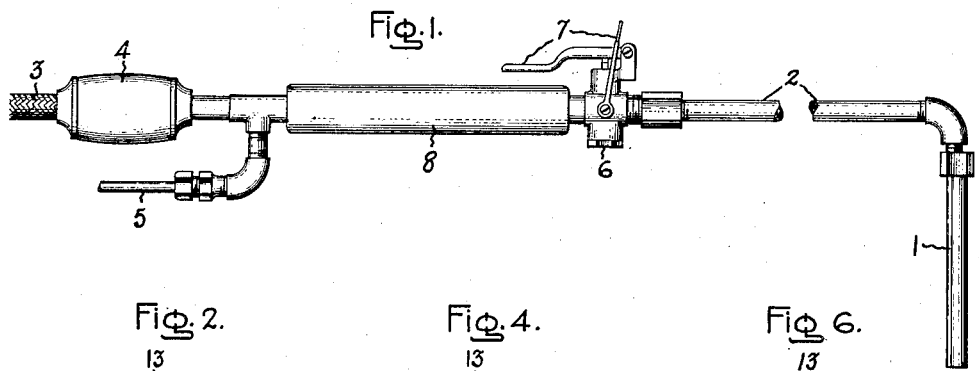
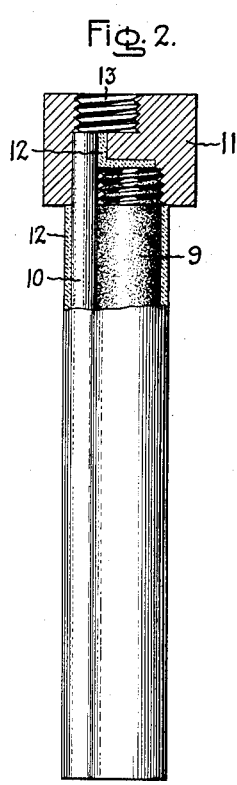 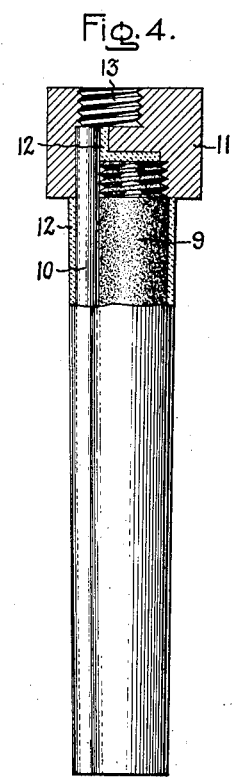 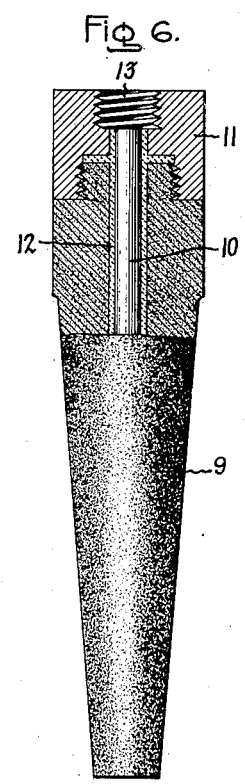
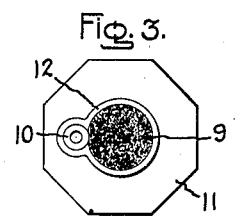 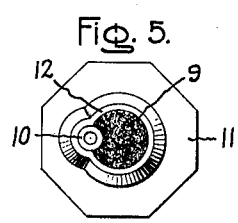 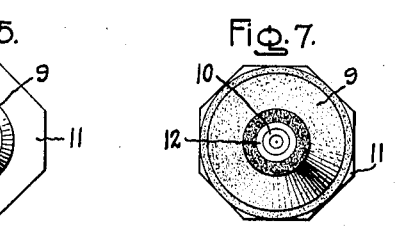
Inventor:
Donald F. Frost,
by Charles E. Tullar
His Attorney.

Patented July 4, 1933

1,917,109

UNITED STATES PATENT OFFICE

DONALD F. FROST, OF ROCKPORT, MASSACHUSETTS, ASSIGNOR TO GENERAL ELECTRIC COMPANY, A CORPORATION OF NEW YORK

OXY-ARC CUTTING NOZZLE

Application filed December 7, 1929. Serial No. 412,528.

My invention relates to improvements in oxy-arc cutting torches such as are used for cutting metals and consists in the provision of an improved tip or nozzle for said torches.

In oxy-arc cutting a portion of the metal at the desired point of section is first heated to its ignition point by means of an electric arc maintained between an electrode and the work and immediately thereafter subjected to the action of a jet of oxygen. The oxygen ignites the previously heated metal which, acting as its own fuel, burns away rapidly in the form of oxide. This oxide runs or is blown out of the cut or kerf by the jet of oxygen used in making the cut. It has already been proposed to supply the oxygen through a passageway in the electrode. When oxygen is supplied in this manner it not only attacks the metal being cut but also the heated portions of the electrode, causing it to burn away rapidly. This action greatly shortens the life of the nozzle or electrode.

An object of my invention is to provide a cutting nozzle for oxy-arc torches in which the electrode is shielded from the action of the oxygen jet by a refractory oxide conduit consumable in the arc at substantially the same rate as the electrode.

A further object of my invention is to so position the oxygen conduit relatively to the electrode that the arc is always maintained to one side and ahead of the oxygen jet, thus enabling a smoother cut to be made than would otherwise be possible.

My invention will be better understood and further objects thereof will become apparent from a consideration of the following description taken in connection with the accompanying drawing and its scope will be pointed out in the appended claims.

In the drawing Fig. 1 illustrates a side view of an oxy-arc cutting torch provided with a cutting nozzle according to my invention and Figs. 2 to 7 show side views partially in section and end views of three types of nozzles embodying my invention.

The oxy-arc torch shown in Fig. 1 is provided with a cutting tip or nozzle 1 such as is shown in greater detail in the remaining figures of the drawing. This tip or nozzle is attached to the end of a pipe 2, constituting the body of the torch, through which electric current and gas is supplied thereto. Current is supplied to pipe 2 through a conductor 3 attached thereto by a coupling 4 and gas is supplied to this pipe through a hose 5. The flow of gas to the cutting nozzle may be controlled by a valve 6 inserted in the pipe 2 provided with control levers 7 extending toward the handle 8 of the torch. Pipe 2 is made preferably of copper or brass since it serves as an electrical conductor as well as a gas conduit. The portion of the torch at or near the cutting tip may be provided with an insulating covering in order to prevent short-circuiting the arc during cutting operations which might otherwise occur if that portion should come in contact with an elevated part of the work being operated on.

The cutting tip or nozzle shown in Figs. 2 and 3 comprises an electrode 9, a juxtaposed tube of insulating refractory oxide material 10 and a coupling 11. The electrode 9 and tube 10 are secured to one another by a refractory cement 12 which is also used in making a gas tight connection between the tube 10 and coupling 11. The tube and electrode may be secured in the coupling 11 in any desired manner. In the illustrated arrangement the assembly is secured through the agency of screw threads. The construction of the coupling 11 will vary according to the construction of the torch. In the illustrated embodiment it is essentially a nut provided with a threaded opening 13 by means of which the tip or nozzle may be attached to the pipe 2 of the torch. It is essential that the tube 10 be formed of some refractory oxide substantially impermeable to gas and so proportioned that it is consumed in the arc in the presence of oxygen at substantially the same rate as the material of the electrode. I prefer to use a quartz tube and a carbon electrode and to join the two parts by a paste made by mixing zircon powder and water glass to a paste which after application to the electrode and tube is baked until hard. The cheaper form of opaque or translucent quartz may be used. I have also found that glass may be used as a tube material although it is not as satisfactory as quartz.

A quartz tube having an inside diameter of .075" has been found suitable for operations on plates from 1 to 2" in thickness but for general purposes such as cutting up scrap a larger tube of .090" inside diameter has been found advantageous. For light work ¼" electrodes will prove satisfactory but on heavy plate 3" or more thick where the gas pressure is high it is necessary to use higher currents to prevent the arc from being blown and therefore larger electrodes about ½" in diameter are found desirable.

Any direct current or alternating current welding set with an open circuit voltage of 75 to 90 volts and capable of supplying 300 amperes may be used in performing a cutting operation with my improved nozzle. The current and gas pressures used vary with the work. In practice the pressure of the gas is set to cut the plate and the current then set to a value suitable for maintaining a stable arc at this pressure. It has been found that usually the gas pressures are approximately the same as in oxy-acetylene cutting and vary with the thickness of the plate. Where the oxygen pressures are low, 20 to 30 pounds, only 150 amperes are needed but on plates requiring 100 or more pounds pressure 300 amperes are more satisfactory. The gas consumption is a function of the pressure used rather than of the voltage and current used. The arc voltage is usually about 20 volts as in ordinary carbon arc welding.

It is possible to cut 1" and 2" plates with my nozzle using the oxy-arc process about twice as fast as it can be done with the oxy-hydrogen process and slightly less than twice as fast as it can be done by the oxy-acetylene process. The speed of cutting with my tip is much greater than with a carbon arc electrode and the consumption of the electrode is much less per linear foot of cut.

The arrangement of parts in the cutting nozzle shown in Figs. 4 and 5 is essentially the same as that shown in Figs. 2 and 3. The parts in these figures have been identified by corresponding reference numerals. In Figs. 4 and 5 the electrode 9 has been channeled out on one side for receiving the tube 10. This construction makes it possible more securely to support the tube on the electrode.

In Figs. 6 and 7 the tube 10 has been inserted in the center of a tapered electrode. A quartz tube may be used in this case as in Figs. 2 to 5. This juxtaposition of the tube and electrode may be secured in several ways. The electrode may be drilled for the reception of the tube or the nozzle formed by moulding carbon about the tube. The nozzle may be made by forming an electrode with a core of quartz or fine silica, passing current through the electrode as a resistor to fuse the quartz or silica in contact with the material of the electrode and thereafter removing the loose material in the center of the core leaving an electrode with a hole having a glazed refractory surface extending therethrough. Thus, as in the case where a glass or a quartz tube is employed, the electrode is provided with a longitudinal passageway of vitreous refractory material.

I have found it advantageous to locate the gas conduit to one side of the electrode as shown in Figs. 2 to 5. By locating the conduit eccentrically to the electrode, a smaller electrode may be used and since the oxygen jet may be made to trail the arc smoother cuts may be made. However, on heavy duty work such as cutting scrap this is not needed and nozzles such as shown in Figs. 6 and 7 may be used. The lower rate of consumption may be due to the cooling effect of the oxygen stream on the electrode. An important advantage of my nozzle over those hitherto proposed is its slow rate of consumption due to the fact that the electrode is shielded from the action of the oxygen jet. When using my nozzle the oxygen is projected rapidly beyond the arcing terminal of the electrode onto the work and the electrode itself is not subjected to its destructive action.

From the foregoing description it is apparent that various changes and modifications may be made in the particular nozzle above referred to without departing from my invention and I, therefore, aim in the appended claims to cover all such changes and modifications as fall within the true spirit and scope of my invention.

What I claim as new and desire to secure by Letters Patent of the United States, is:

1. An oxy-arc cutting nozzle comprising an electrode and a juxtaposed conduit of refractory oxide material consumable in the arc at substantially the same rate as said electrode extending along said electrode.

2. An oxy-arc cutting nozzle comprising an electrode and a refractory oxide conduit substantially impermeable to gas and consumable in the arc at substantially the same rate as said electrode supported by and extending along said electrode for shielding the arcing terminal of said electrode from the action of the oxygen jet supplied thereto through said conduit.

3. An oxy-arc cutting nozzlze comprising an electrode, a refractory oxide conduit consumable in an oxy-arc at substantially the same rate as said electrode, and means for holding said electrode and said conduit in juxtaposition.

4. An oxy-arc cutting nozzle comprising an electrode, a refractory oxide conduit consumable in an oxy-arc at substantially the same rate as said electrode, means for holding said electrode and said conduit in juxtaposition, and means for connecting said electrode to a source of electric current and said conduit to a source of oxygen.

5. An oxy-arc cutting nozzle comprising a carbon electrode, a quartz tube consumable in an oxy-arc at substantially the same rate as said electrode extending along said electrode and a layer of refractory cement about said quartz tube and said electrode.

6. An oxy-arc cutting nozzle comprising an electrode, a refractory conduit consumable in an oxy-arc at substantially the same rate as said electrode, and means for supporting said conduit on and eccentrically to said electrode.

7. An oxy-arc cutting nozzle comprising an electrode, a quartz tube consumable in an oxy-arc at substantially the same rate as said electrode extending along said electrode, means for connecting one end of said electrode to a source of current and the corresponding end of said tube to a source of oxygen, and a refractory cement connecting said tube to said electrode.

8. An oxy-arc cutting nozzle of carbon having a longitudinal passageway of vitreous refractory material.

9. An oxy-arc cutting nozzle comprising an electrode and a refractory oxide conduit extending along said electrode and embedded in a refractory cement attached to said electrode.

In witness whereof, I have hereto set my hand this 3rd day of December, 1929.

DONALD F. FROST.